United States Patent [19]

Cuthbertson

[11] Patent Number: 5,391,873
[45] Date of Patent: Feb. 21, 1995

[54] IMAGING APPARATUS COMPENSATING FOR NONUNIFORMITY IN DETECTOR OUTPUTS

[75] Inventor: Glenn Cuthbertson, Essex, United Kingdom

[73] Assignee: GEC-Marconi Limited, Middlesex, United Kingdom

[21] Appl. No.: 63,749

[22] Filed: May 20, 1993

[30] Foreign Application Priority Data

Jun. 22, 1992 [GB] United Kingdom ............... 9213172

[51] Int. Cl.⁶ ............................................ G01J 5/10
[52] U.S. Cl. .................................. 250/334; 250/332
[58] Field of Search ............ 250/349, 332, 334, 370.08, 250/208.1; 358/213.15, 213.18; 348/164, 662

[56] References Cited

U.S. PATENT DOCUMENTS

| | | | |
|---|---|---|---|
| 4,042,959 | 8/1977 | Klein | 358/167 |
| 4,079,423 | 3/1978 | Diehl | 358/213.18 |
| 4,225,883 | 9/1980 | Van Atta et al. | 250/334 |
| 4,298,887 | 11/1981 | Rode | 358/213.15 |
| 4,315,284 | 2/1982 | Stillwell et al. | 358/213.15 |
| 4,450,479 | 5/1984 | Horne | 250/332 |
| 4,705,945 | 11/1987 | Worcester | 250/334 |

Primary Examiner—Carolyn E. Fields
Attorney, Agent, or Firm—Lowe, Price, LeBlanc & Becker

[57] ABSTRACT

This invention provides imaging apparatus in which an image is scanned over an array of sensing elements 2, the outputs of which form a plurality of channels. Signal processing means 6 adds a noise signal to at least some of the channels to more closely match the signal to noise ratio of the channels and reduce linear noise structures, to which the eyebrain is particularly sensitive, in the output signal 10 of the processing means.

14 Claims, 2 Drawing Sheets

IMAGING APPARATUS COMPENSATING FOR NONUNIFORMITY IN DETECTOR OUTPUTS

FIELD OF THE INVENTION

This invention relates to imaging apparatus, wherein a received image is caused to be scanned over an array of detector elements, and in particular to the type in which the detector elements either extend along the whole of one axis of the field-of-view, such that one scan of the image across the array of detector elements produces outputs representative of the complete image, or alternatively of the type where the array of detector elements extends only along a portion of one axis of the field-of-view, and wherein the image is scanned in swathes across the detector elements to produce an output representative of the complete image.

The invention is applicable to the above mentioned types of imager for receiving any form of electromagnetic radiation, and in particular to apparatus for receiving optical radiation especially infra-red radiation. In this specification, both in describing the prior art and the present invention, infra-red imaging apparatus is referred to. However, the same problems arise in other applications such as sonar and radar, and the invention is equally applicable to such other applications.

DESCRIPTION OF THE PRIOR ART

High performance thermal imagers almost exclusively use arrays of cryogenically cooled Infra-red detectors. To date, the vast majority of imagers have built-up their pictures by opto-mechanically scanning these arrays of detectors over the field-of-view in a suitable pattern, the image being built-up from the signal generated by these multiple detectors. Multiple element detectors are used to increase the total information bandwidth of the system, either to increase the thermal sensitivity or the number of pixels generated per second, that is the product of the scanned field-of-view divided by the instantaneous field of view of the detector, times the number of fields-of-view per second.

These arrays of detectors may be configured in a number of different ways. For example a long vertical line of detectors, subtending the required vertical field-of-view, may be scanned slowly horizontally to generate a complete picture. This is called parallel scanning. Conversely, a long horizontal linear array of detectors may be scanned horizontally at very high speed generating a large number of serial data streams of the same information but laterally displaced from each other. These individual signals are timed delayed and added. A second scanned mechanism then slowly scans the pattern in the vertical direction to build-up the whole picture. This is called serial scanning. Between these two extremes, two-dimensional arrays of detectors, the so-called serial parallel scans, can work at intermediate speeds with a smaller number of time delay circuits to build up pictures from bands or swathes of information.

By the nature of the detector materials, the outputs from individual detectors vary slightly for a fixed input. Much of the electronics effort is therefore in correcting these mismatches both in terms of any d.c. offset between the channels and any gain or slope variations. Generally, gain corrections will only be 2 point corrections although there are schemes in which higher order curved corrections are conceivable. Although in general, the performance limit of such imagers is said to be either the minimum temperature difference which can be either perceived by human observer, or measured by an electronic processor, or the smallest object that an imager can see under given circumstances, it has been apparent for sometime that the difficulty of accurately matching multiple channels has added a third limit to the performance of such system. Specifically the non-uniformities introduced to the image by the residual mismatches between channels are particularly problematic because the eye is especially sensitive to linear structures formed in the resultant image. The matching of all the channels will lead to an improvement in picture uniformity which in turn will allow the eyebrain to achieve detection, recognition and identification tasks to a significantly higher probability, than in the case where non-uniformities in the detector elements are uncorrected.

This thinking led to the adoption of pure serial scanners, described above, in which every detector element scans every pixel in the scene. To a first order this should give exactly the same output on every line of the image independent of residual detector non-uniformities.

Unfortunately, to achieve television rates requires optical mechanical motions typically at around 160,000 rpm on a suitably faceted polygon. This in practice has meant running in vacuum and therefore has made the design, manufacture and maintenance of such devices impracticable especially in a severe environment. Conversely, the so-called parallel scanners, with a different element for each line, have the worst problem of matching and this has never been satisfactorily resolved. The serial parallel scanner seeks to compromise the opto-mechanical disadvantages of a serial scanner with the advantages of a reduced number of channels and therefore improved picture uniformity. This has been further enhanced with the adoption of Transfer Electron Drift (TED) detectors where high performance systems are achievable with a limited number of detectors, using serial parallel scanners, where the time delay and add function are done in the detector, where channel matching can be achieved to a high degree of accuracy.

Even though the d.c. offset and gain of the above mentioned detectors can be matched, it has been found that the eyebrain is still able to detect corruption of a displayed image.

BRIEF SUMMARY OF THE INVENTION

According to the present invention there is provided imaging apparatus comprising: an array of detector elements each for providing, in response to received radiation, an output defining a channel; a scanning mechanism for causing a received image to be scanned over the array of detector elements; and signal processing means for receiving each channel, and providing an output representative of the received image, the signal processing means having associated with each channel a channel matching means for compensating for non-uniformity in the outputs of the detector elements for a given input, wherein each channel matching means comprises means for adding a noise source to the channel with which it is associated. Preferably the channel matching means adds noise to a channel such that the signal to noise ratio of each channel is substantially equal.

It has been realised that although the d.c. offset and gain of each detector element, (which term, for the purposes of this specification, also includes a plurality of detector elements having a common output), can be matched, the signal to noise ratio of each detector element may be different. This is further compounded by matching the gain of each channel, as varying the amplification of a channel to match the gain of all the channels results in differing amplifications of the noise output power from each detector. This has previously limited the performance of an imager because the eye-brain has the ability to pick out this difference in noise level.

By employing the present invention substantially identical noise powers are generated on the outputs of all the channels, and even though this means that the performance of most channels will be reduced to the intrinsic signal to noise ratio of the poorest detector, the net result is a significant improvement in the perceived uniformity of the system, and therefore the eyebrain's ability to do specific tasks. Typically modern detectors are matched to between ten and twenty percent signal to noise ratio. Thus in the worst case, the signal to noise ratio of the best channel will be degraded by that same ten to twenty percent. However as the eye is particularly sensitive to linear noise structures created by any differences in the signal to noise ratio, the matching of all the channels will lead to an improvement in picture uniformity which in turn will allow the eyebrain to achieve detection, recognition and identification tasks to a significantly higher probability than the case where noise structure is uncorrected.

Preferably each channel matching means comprises means for equalising the responsitivity of each channel, advantageously including means for compensating for d.c. offset between channels and for compensating for differences in the gain characteristic of each channel. In certain embodiments it is advantageous if the signal processing means actively controls the noise signal added to each channel.

The noise added can be white noise, however depending upon the frequency range in which the associated detector element is operating it can be preferable to add coloured noise or a plurality of noise signals.

The invention is particularly advantageous when the detector elements are responsive to infra-red radiation and preferably the detector elements of TED's. The invention is especially advantageous when the image is scanned in swathes across the detector elements.

BRIEF DESCRIPTION OF THE DRAWINGS

One embodiment of the invention will now be described, byway of example only, with reference to the accompanying figures of which.

DETAILED DESCRIPTION

Figure 1:
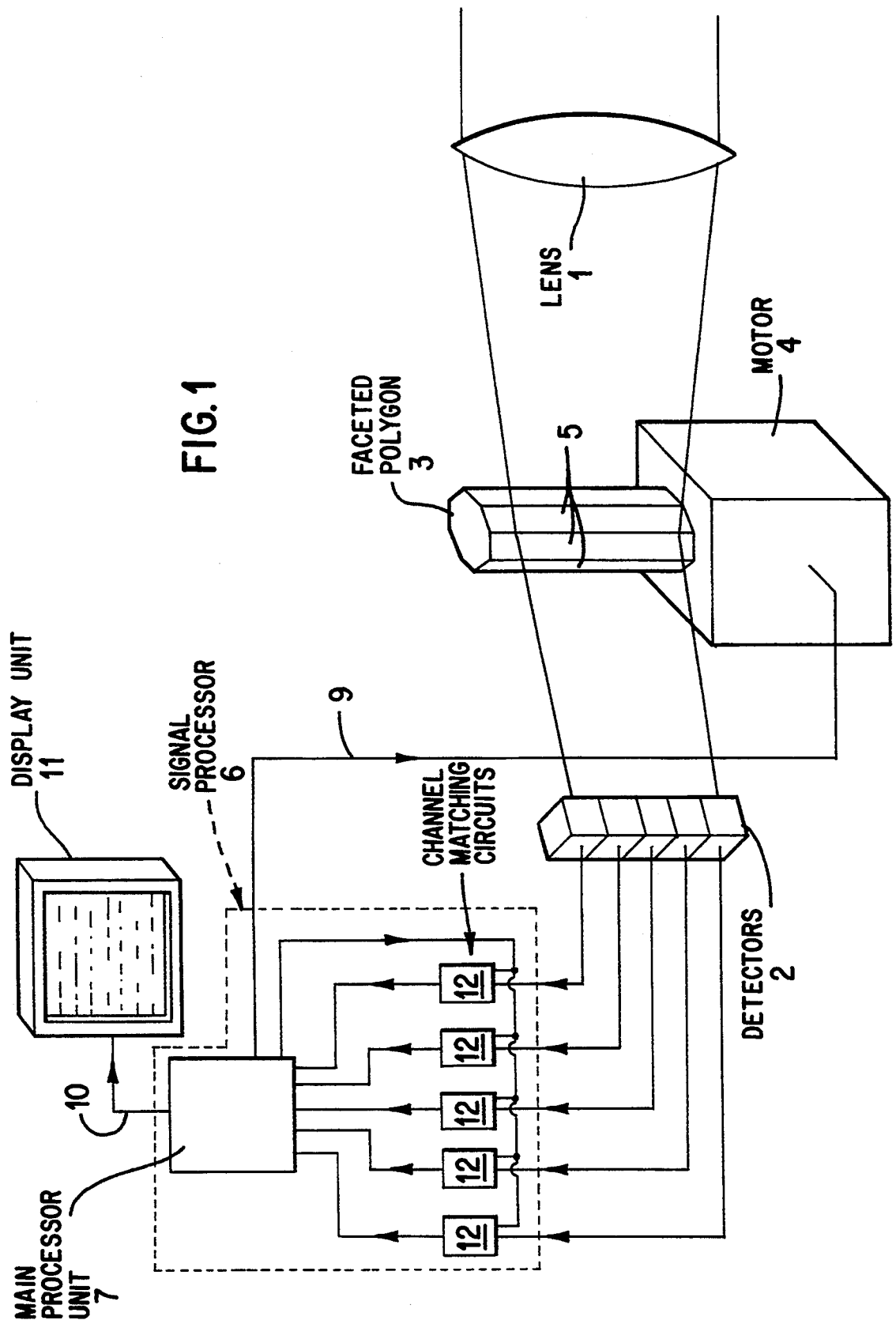
FIG. 1 schematically illustrates imaging apparatus in accordance with the present invention.

Referring to FIG. 1, an image is received from a distant source and focused by lens 1 onto an array of detector elements 2 by means of a rotating polygon 3, driven by motor 4. The faces 5 of the polygon 3 are each inclined at different angles such that the image focused by the lens 1 is scanned across the array of detector elements 2 in swathes. Of course the same effect can equally be achieved by employing a polygon having parallel faces in conjunction with an oscilating frame mirror.

The output channels of the detector elements 2 are connected to a signal processor, indicated generally as 6. This comprises a main processing unit 7, which via line 9 synchronises the rotation of the polygon with the readout of the array of detector elements. This main unit 7 of the processor also provides means for combining the signals from the detector elements to provide a video output signal, on line 10, to display unit 11.

The processing means 6 has associated with each channel, channel matching means 12 which are controlled by the main processing unit 7 to match the d.c. offset, gain and noise signal of each channel. Each of the channel matching circuits is identical and is illustrated in FIG. 2.

Figure 2:
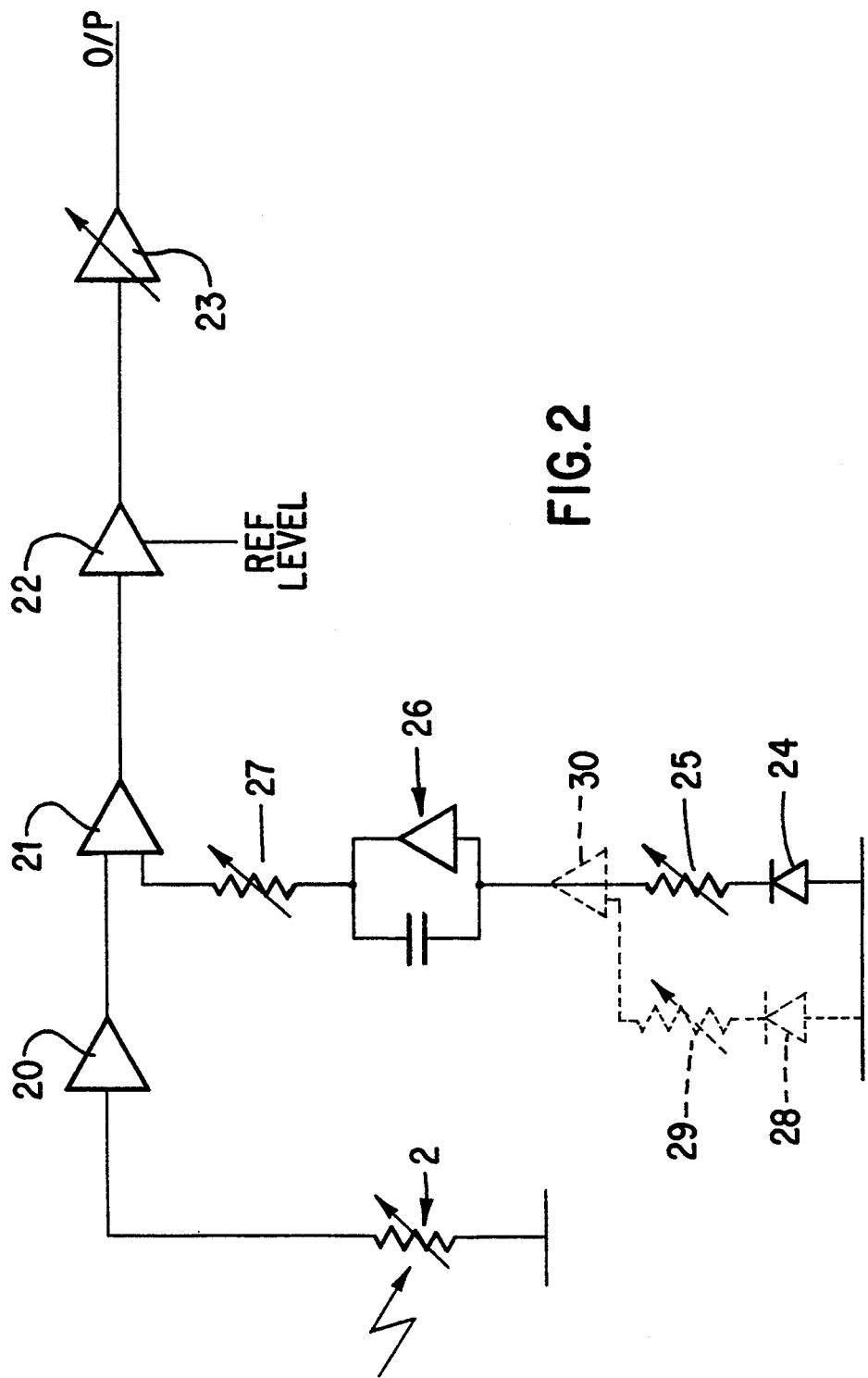
FIG. 2 diagrammatically illustrates the processing circuitry associated with each individual detector element of FIG. 1.

Referring to FIG. 2, one of the detector elements 2 of FIG. 1 is connected to a pre-amplifier 20, summing amplifier 21, a clamp amplifier 22 and variable gain amplifier 23 which provides an output to the main processor unit 7 of FIG. 1. The summing amplifier 21 provides a means for introducing a noise input to the channel which is discussed below. Clamp amplifier 22 controls the output in accordance with a reference level signal common to all the matching circuits such that all the circuits have a common d.c. offset. The gain of amplifier 23 is controlled by the main processor unit 7 of FIG. 1 and is controlled such that the gain of the channels is matched.

The summing amplifier 21 also receives an input from a white noise source 24 the output of which is controlled by the main processor unit 7 via variable resistance 25. The output of the resistor is connected to filter circuit 26 which matches the top end fall off of the white noise source to that of the detector element 2. The output again being controlled by the main processor unit 7, via variable resistance 27, such that the noise signal input to the summing amplifier 21 causes the signal to noise ratio of the final output signal on the channel, as amplified by amplifiers 22 and 23 to be equal to that produced by the channel with the worst inherent signal to noise ratio, to which all the channels are matched.

Depending on the type of detector element used, and the frequency with which it operates, it may be desirable to add additional noise sources, for example a 1/f noise source 28, which may also be controlled by the main processor unit 7, via variable resistance 29. The outputs of the different noise sources are summed by summing amplifier 30. These additional components are shown by broken lines only, to indicate that this is one possible alternative embodiment only. A plurality of such additional noise sources can be incorporated as necessary.

In FIG. 2 the noise source has been added to the signal from the I.R. detector 2 prior to a d.c. offset and gain correction being applied. However, it will be appreciated by one skilled in the art that this noise signal could be applied after the d.c. offset and gain corrections have been applied.

The invention has been described with reference to an I.R. detector system, but it can equally be applied to any detector system having an array of detector elements over which a scene is scanned.

I claim:

1. Imaging apparatus comprising: an array of detector elements each for providing, in response to received radiation, an output defining a channel; a scanning mechanism for causing a received image to be scanned over the array of detector elements; and signal processing means for receiving each channel and providing an output representative of the received image, the signal processing means having associated with each channel a channel matching means for compensating for non-uniformity in the outputs of the detector elements for a given input, wherein each channel matching means comprises a means for adding a noise source to the channel with which it is associated.

2. Imaging apparatus as claimed in claim 1 wherein the channel matching means adds noise to a channel such that the signal to noise ratio of each channel is substantially equal.

3. Imaging apparatus as claimed in claim 1 wherein each channel matching means comprises means for equalising the responsitivity of each channel.

4. Imaging apparatus as claimed in claim 3 including means for compensating for DC offset between channels.

5. Imaging apparatus as claimed in claim 3 including means for compensating for differences in the gain characteristics of each channel.

6. Imaging apparatus as claimed in claim 1 wherein the image is scanned across the detector elements in swathes.

7. Imaging apparatus as claimed in claim 6 wherein each swathe comprises a number of rows corresponding to the number of detector elements.

8. Imaging apparatus as claimed in claim 1 wherein the noise added is white noise.

9. Imaging apparatus as claimed in claim 1 wherein a plurality of noise sources are added to each channel, the number of said sources being proportional to the frequency range in which the associated detector element is operating.

10. Imaging apparatus as claimed in claim 1 further comprising a display for the received image.

11. Imaging apparatus as claimed in claim 1 wherein the signal processing means actively controls the noise signal added to each channel.

12. Imaging apparatus as claimed in claim 1, wherein the detector elements are responsive to infra-red radiation.

13. Imaging apparatus as claimed in claim 8 wherein the scanning mechanism comprises a rotating multi-faceted polygon.

14. Imaging apparatus as claimed in claim 8 wherein the detector elements are TED detectors.

* * * * *